(12) United States Patent
Bergman et al.

(10) Patent No.: US 12,254,369 B2
(45) Date of Patent: Mar. 18, 2025

(54) SYSTEMS AND METHODS FOR PROVIDING A SECURITY TAG WITH SYNCHRONIZED DISPLAY

(71) Applicant: SENSORMATIC ELECTRONICS, LLC, Boca Raton, FL (US)

(72) Inventors: Adam S. Bergman, Boca Raton, FL (US); Mohammad Mohiuddin, Boynton Beach, FL (US)

(73) Assignee: Sensormatic Electronics, LLC, Boca Raton, FL (US)

( * ) Notice: Subject to any disclaimer, the term of this patent is extended or adjusted under 35 U.S.C. 154(b) by 0 days.

(21) Appl. No.: 16/605,442

(22) PCT Filed: Apr. 19, 2017

(86) PCT No.: PCT/US2017/028378
§ 371 (c)(1),
(2) Date: Oct. 15, 2019

(87) PCT Pub. No.: WO2018/194589
PCT Pub. Date: Oct. 25, 2018

(65) Prior Publication Data
US 2020/0050913 A1     Feb. 13, 2020

(51) Int. Cl.
*G06K 19/077* (2006.01)
*G06K 19/07* (2006.01)
(Continued)

(52) U.S. Cl.
CPC ... *G06K 19/07707* (2013.01); *G06K 19/0707* (2013.01); *G06K 19/0723* (2013.01); *G06Q 30/0623* (2013.01); *G08B 13/2417* (2013.01)

(58) Field of Classification Search
None
See application file for complete search history.

(56) References Cited

U.S. PATENT DOCUMENTS

| 5,019,811 A * | 5/1991 | Olsson | G06F 3/147 340/5.91 |
| 6,269,342 B1 * | 7/2001 | Brick | G06F 3/147 235/383 |

(Continued)

FOREIGN PATENT DOCUMENTS

JP     2011108139 A   *   6/2011

OTHER PUBLICATIONS

International Search Report mailed on Jun. 22, 2017 in PCT/US17/28378.

*Primary Examiner* — Muhammad Adnan
(74) *Attorney, Agent, or Firm* — ArentFox Schiff LLP

(57) ABSTRACT

Systems and methods for operating a Security Tag ("ST") coupled to an item. The methods comprise: storing first Item Related Information ("IRI") is a datastore of ST that is associated with an output device and second IRI in an integrated RFID element of ST; receiving third IRI at a microcontroller of ST; performing comparison operations by the microcontroller to compare the third IRI with the first and/or second IRI; using the third IRI to write over the first and/or second IRI based on results of the comparison operations; and synchronizing advertised information and register information for the item by outputting the third IRI from the output device and the integrated RFID element.

14 Claims, 8 Drawing Sheets

(51) Int. Cl.
*G06Q 30/0601* (2023.01)
*G08B 13/24* (2006.01)

(56) References Cited

U.S. PATENT DOCUMENTS

| | | | | |
|---|---|---|---|---|
| 7,549,579 | B2* | 6/2009 | Overhultz | G06Q 10/02 |
| | | | | 235/383 |
| 8,917,159 | B2* | 12/2014 | McAllister | H04L 9/3234 |
| | | | | 340/10.51 |
| 9,111,252 | B1* | 8/2015 | Huang | G06Q 10/08 |
| RE46,319 | E* | 2/2017 | Milman | G06Q 50/16 |
| 9,898,746 | B2* | 2/2018 | Argue | G06Q 30/02 |
| 9,904,832 | B1* | 2/2018 | Carty | G06K 19/06028 |
| 10,169,626 | B2* | 1/2019 | Britt | G06K 7/10257 |
| 10,325,464 | B1* | 6/2019 | Trivelpiece | G08B 13/248 |
| 10,431,062 | B1* | 10/2019 | Bergman | G08B 13/2454 |
| 10,783,424 | B1* | 9/2020 | Trivelpiece | G06K 19/0726 |
| 10,817,766 | B2* | 10/2020 | Batra | G06K 19/07707 |
| 10,922,505 | B2* | 2/2021 | Takayama | G06K 19/0709 |
| 2002/0149468 | A1* | 10/2002 | Carrender | G06K 19/0723 |
| | | | | 340/5.31 |
| 2003/0050055 | A1* | 3/2003 | Ting | H04M 3/42178 |
| | | | | 455/419 |
| 2005/0218218 | A1* | 10/2005 | Koster | G06F 3/147 |
| | | | | 235/383 |
| 2005/0252957 | A1* | 11/2005 | Howarth | G01S 13/825 |
| | | | | 340/572.1 |
| 2007/0159298 | A1* | 7/2007 | Zegelin | G06K 17/0022 |
| | | | | 340/5.91 |
| 2008/0141009 | A1* | 6/2008 | Minami | H04L 69/162 |
| | | | | 712/225 |
| 2008/0143532 | A1* | 6/2008 | Murrah | G06K 19/0717 |
| | | | | 340/572.4 |
| 2009/0295549 | A1* | 12/2009 | Han | G06K 19/0707 |
| | | | | 340/10.51 |
| 2011/0102155 | A1* | 5/2011 | Choi | G06Q 30/06 |
| | | | | 235/383 |
| 2011/0154104 | A1* | 6/2011 | Swanson | G06F 11/203 |
| | | | | 711/E12.001 |
| 2011/0289023 | A1* | 11/2011 | Forster | G06Q 30/02 |
| | | | | 340/10.6 |
| 2012/0126982 | A1* | 5/2012 | Lee | G06Q 30/06 |
| | | | | 340/572.1 |
| 2012/0221813 | A1* | 8/2012 | Inoue | G06F 11/2082 |
| | | | | 711/E12.103 |
| 2012/0326849 | A1* | 12/2012 | Relihan | G07G 1/145 |
| | | | | 340/10.6 |
| 2013/0048721 | A1* | 2/2013 | Rasband | G06F 16/9554 |
| | | | | 235/383 |
| 2013/0194097 | A1* | 8/2013 | Joseph | G08B 13/2417 |
| | | | | 340/572.1 |
| 2014/0010014 | A1* | 1/2014 | Cornwell | G11C 16/10 |
| | | | | 365/185.11 |
| 2014/0091932 | A1* | 4/2014 | Mohiuddin | G08B 13/246 |
| | | | | 340/572.1 |
| 2014/0091933 | A1* | 4/2014 | Mohiuddin | G08B 13/246 |
| | | | | 340/572.1 |
| 2014/0195703 | A1* | 7/2014 | Bordow | G06F 5/10 |
| | | | | 710/57 |
| 2014/0224867 | A1* | 8/2014 | Werner | H04W 4/80 |
| | | | | 235/375 |
| 2015/0035674 | A1* | 2/2015 | Karhuketo | G08B 13/2434 |
| | | | | 340/568.1 |
| 2015/0112826 | A1* | 4/2015 | Crutchfield, Jr. | G06Q 30/0643 |
| | | | | 705/26.1 |
| 2015/0169907 | A1* | 6/2015 | Chang | H02J 50/40 |
| | | | | 340/10.6 |
| 2015/0178643 | A1* | 6/2015 | Park | G06Q 10/02 |
| | | | | 705/5 |
| 2015/0186911 | A1* | 7/2015 | Vierra | G06Q 30/0206 |
| | | | | 705/7.35 |
| 2015/0228235 | A1* | 8/2015 | Davis | G09G 3/3611 |
| | | | | 345/98 |
| 2015/0270776 | A1* | 9/2015 | Mallik | H02M 3/156 |
| | | | | 307/31 |
| 2016/0035291 | A1* | 2/2016 | Hung | G09G 3/36 |
| | | | | 345/204 |
| 2016/0048907 | A1* | 2/2016 | Park | G06Q 30/0641 |
| | | | | 345/634 |
| 2016/0078264 | A1* | 3/2016 | Armstrong | G08B 13/2462 |
| | | | | 340/572.1 |
| 2016/0246529 | A1* | 8/2016 | Kim | G11C 16/16 |
| 2017/0287297 | A1* | 10/2017 | Hardie-Bick | G08B 13/246 |
| 2018/0189719 | A1* | 7/2018 | Sequeira | G06Q 10/087 |
| 2018/0204029 | A1* | 7/2018 | Butler | G06K 7/0008 |
| 2018/0204199 | A1* | 7/2018 | Mohiuddin | G06Q 20/203 |
| 2018/0276431 | A1* | 9/2018 | Sequeira | G06Q 20/20 |
| 2019/0172088 | A1* | 6/2019 | Mohiuddin | G06Q 30/02 |
| 2019/0354824 | A1* | 11/2019 | Mohiuddin | G06K 19/0704 |
| 2020/0125809 | A1* | 4/2020 | Tsuchida | G06K 7/10366 |
| 2020/0211094 | A1* | 7/2020 | Guan | G06F 16/909 |
| 2022/0309261 | A1* | 9/2022 | Sundholm | G09F 3/208 |
| 2022/0366472 | A1* | 11/2022 | Yee | G06N 5/04 |

\* cited by examiner

SYSTEMS AND METHODS FOR PROVIDING A SECURITY TAG WITH SYNCHRONIZED DISPLAY

CROSS REFERENCE TO RELATED APPLICATIONS

This application is a § 371 U.S. National Phase Entry of International Patent Application No. PCT/US2017/028378, filed on Apr. 19, 2017, the entirety of which is hereby incorporated herein by reference.

BACKGROUND

Statement of the Technical Field

The present disclosure concerns generally to labels and tags which display item related information (e.g., pricing information). More particularly, the present invention relates to implementing systems and methods for providing a security tag with a synchronized display.

Description of the Related Art

Many of merchandise in a department store have a printed tag attached to them that displays information about the product (such as the item's price and/or description). Furthermore, the same pricing tag may have an EAS component embedded therein or attached thereto for theft prevention. Once a pricing tag is affixed to a product, the information on the pricing tag cannot be easily modified.

In some scenarios, price labels are used to display the price for a group of merchandise. The price labels are often paper-based labels affixed to the shelves on which the merchandise is disposed or on the merchandise themselves. Paper-based labels require the tedious and manually-intensive process of printing and applying new labels every time there is a price or product description update. This is a laborious and time-consuming process for store associates.

SUMMARY

The present invention concerns implementing systems and methods for operating a security tag coupled to an item. The method comprises: storing first item related information is a datastore of the security tag that is associated with an output device (e.g., a display and/or a speaker) and second item related information in an integrated Radio Frequency Identification ("RFID") element of the security tag; receiving third item related information at a microcontroller of the security tag; performing comparison operations by the microcontroller to compare the third item related information with at least one of the first item related information and the second item related information; using the third item related information to write over at least one of the first item related information and the second item related information based on results of the comparison operations; and synchronizing advertised information and register information for the item by outputting the third item related information from the output device and the integrated RFID element.

In some scenarios, the first, second and/or third item related information comprises at least one of an item description, item nutritional information, a promotional message, an item regular price, an item sale price, a currency symbol, and a source of the item. The microcontroller receives the third item related information directly from the integrated RFID element, a communications device of the security tag, or an external device via at least one electrical contact of the security tag.

In those or other scenarios, the method comprises: receiving the third item related information at the integrated RFID element; using the third item related information to write over the second item related information; notifying the microcontroller that the second item related information has been written over; and performing operations by the microcontroller (in response to the notifying) to receive the third item related information from the integrated RFID element and to obtain the first item related information from the datastore, prior to performing the comparison operations.

In those or other scenarios, the method comprises: receiving the third item related information at a communication device of the security tag; using the third item related information to write over the first item related information; notifying the microcontroller that the first item related information has been written over; and performing operations by the microcontroller (in response to the notifying) to receive the third item related information from the communication device and to obtain the second item related information from the integrated RFID element, prior to performing the comparison operations.

In those or other scenarios, the microcontroller: receives the third item related information via a wired connection facilitated by at least one electrical contact of the security tag; and performs operations (in response to the reception of the third item related information) to obtain the first item related information from the output device and the second item related information from the integrated RFID element, prior to performing the comparison operations.

In those or yet other scenarios, the method comprises harvesting energy from an external energy source and using the harvested energy to power electronic components of the security tag at least during a synchronization of the advertised information and register information. The security tag may also comprise an integrated EAS component in addition to the integrated RFID component. The third item related information is communicated to the security tag in response to a trigger event for updating the advertised information or the register information.

BRIEF DESCRIPTION OF THE DRAWINGS

Embodiments will be described with reference to the following drawing figures, in which like numerals represent like items throughout the figures.

DETAILED DESCRIPTION

Figure 1:
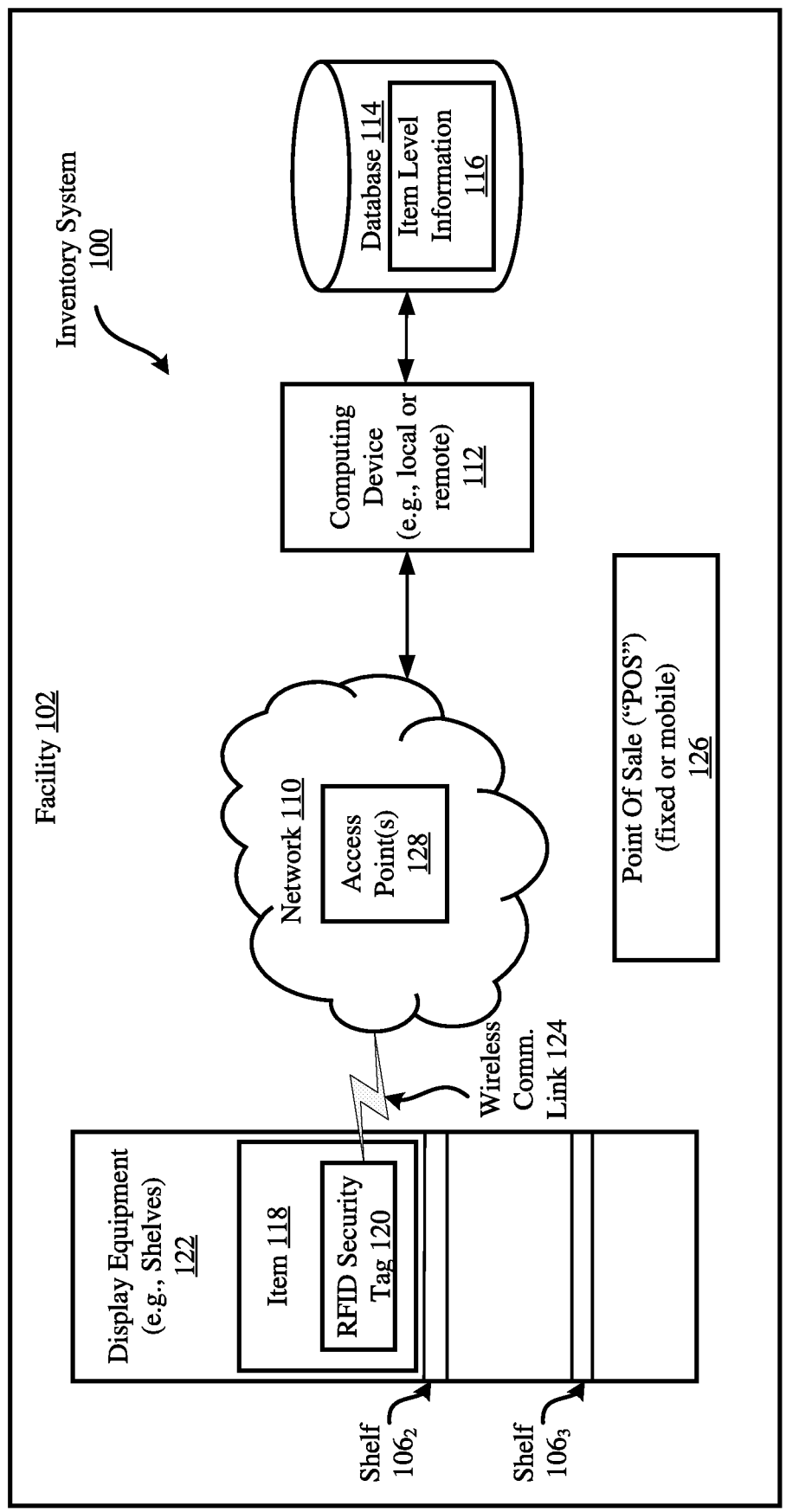
FIG. 1 is an illustration of an exemplary inventory system.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout the specification may, but do not necessarily, refer to the same embodiment.

Furthermore, the described features, advantages and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

Security Tags are currently sold with integrated Radio Frequency Identification ("RFID") elements which store many fields of information. In some cases, the RFID element stores item price information for use at the Point Of Sale ("POS"). If an integrated price display is to be added to such a security tag, it is desired to add a synchronization of the RFID element price and the intended price on the display. Accordingly, the present solution concerns systems and methods for synchronizing register information and display information.

Referring now to FIG. 1, there is provided an illustration of an exemplary inventory system 100. Inventory system 100 is entirely or at least partially disposed within a facility 102. The facility 102 can include, but is not limited to, a manufacturer's facility, a distribution center facility, a retail store facility or other facility within a supply chain.

As shown in FIG. 1, at least one item 118 resides within the facility 102. The item 118 is disposed on display equipment 122. The display equipment includes, but is not limited to, shelves $106_1$-$106_3$, display cabinets, and/or exhibit cases. The item 118 has an RFID security tag 120 coupled thereto. This coupling is achieved via an adhesive (e.g., glue), a mechanical coupler (e.g., straps, clamps, snaps, etc.), a weld, chemical bond or other means.

The RFID security tag 120 is generally configured to provide a visual and/or auditory output of first item level information (referred to herein as "advertised information") to people located in proximity thereto (e.g., customers), as well as a signal output of second item level information (referred to herein as "register information") to a fixed or mobile Point Of Sale ("POS") 126. The first and/or second item level information include(s), but is(are) not limited to, an item description, item nutritional information, a promotional message, an item regular price, an item sale price, a currency symbol, and/or a source of the item. The RFID security tag 120 will be described in detail below in relation to FIGS. 2-4. The first and second item level information can be output in a format selected from a plurality of formats based on a geographic location of the item, a date, and/or an item pricing status (e.g., whether the item is on sale). In a display context, the format is defined by a font parameter, a color parameter, a brightness parameter, and/or a display blinking parameter. In an auditory context, the format is defined by a volume parameter, a voice tone parameter, and/or a male/female voice selection parameter.

The RFID security tag 120 comprise wireless communication components that enable the communication of item level information thereto and/or therefrom. The wireless communication components can implement one or more different types of communication technology. The communication technologies can include, but are not limited to, Radio Frequency ("RF") communication technology, Bluetooth technology, WiFi technology, beacon technology, magnetic induction technology, and/or LiFi technology. Each of the listed types of communication technology are well known in the art, and therefore will not be described herein.

The first and second item level information is provided to the RFID security tag 120 from a computing device 112 via a network 110. The computing device 112 can be local to the facility 102 as shown in FIG. 1 or remote from the facility 102. The computing device 112 will be described in detail below in relation to FIG. 5. However, at this time, it should be understood that the computing device 112 is configured to: write data to and read data from a database 114 and/or RFID security tag 120; and/or perform language and currency conversion operations using item level information obtained from the database 114 and/or RFID security tag 120. The data can include, but is not limited to, item level information 116.

Accordingly, the computing device 112 facilitates updates to the advertised information and register information output from the RFID security tag 120. Such information updating can be performed periodically, in response to instructions received from an associate (e.g., a retail store employee), and/or in response to a detected change in the item level information 116. For example, if a certain product is placed on sale, then the sale price for that product is transmitted to access point 128, which in turn transmits the sale price to each RFID security tag associated with that product. The sale price is then output from the RFID security tag. The present solution is not limited to the particulars of this example.

The network 110 interconnects the computing device 112 with at least one access point 128. Network 110 can be a wired or wireless network facilitating communication between computing device 112 and the access point 128. The access point 128 receives the item level information 116 from the computing device 112, optionally translates this information, and sends it to the RFID security tag 120 via wireless communication links 124.

Although a single computing device 112 is shown in FIG. 1, the present solution is not limited in this regard. It is contemplated that more than one computing device can be implemented. Also, the present solution is not limited to the exemplary inventory system architecture described in relation to FIG. 1.

Figure 2:
FIG. 2 is an illustration of an exemplary display for an Electronic Smart Tag ("EST").

Referring now to FIG. 2, there is an illustration of an exemplary RFID security tag 200 displaying advertised information (e.g., an item's price). An exemplary architecture for the RFID security tag 200 is provided in FIGS. 3-4. RFID security tag 120 of FIG. 1 is the same as or substantially similar to RFID security tag 200. As such, the discussion of RFID security tag 200 is sufficient for understanding the RFID security tag 120 of FIG. 1.

Figure 3:
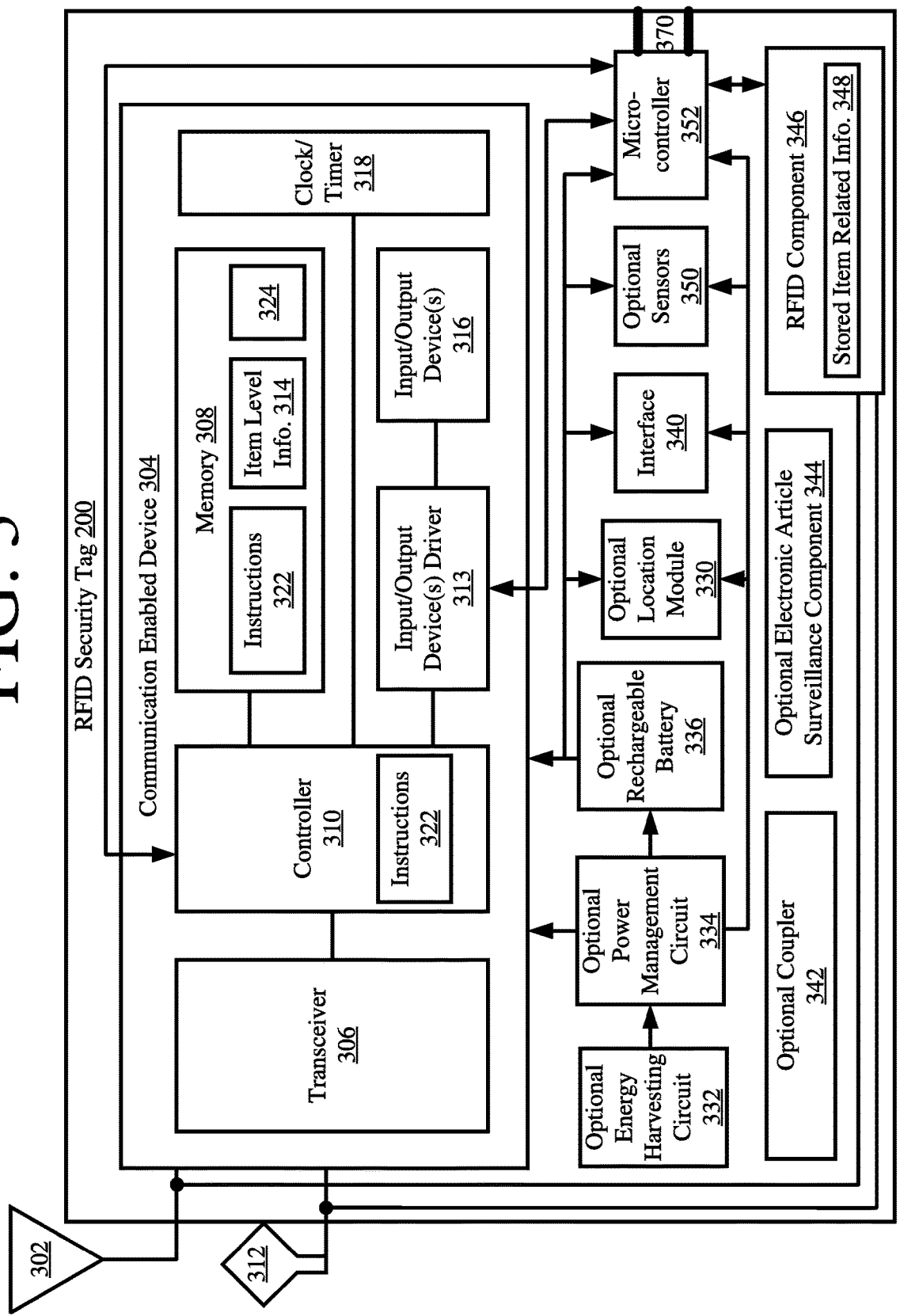
FIG. 3 provides an illustration of an exemplary architecture for the EST of FIG. 2.

The RFID security tag 200 can include more or less components than that shown in FIG. 3. However, the components shown are sufficient to disclose an illustrative embodiment implementing the present solution. Some or all of the components of the RFID security tag 200 can be implemented in hardware, software and/or a combination of hardware and software. The hardware includes, but is not limited to, one or more electronic circuits. The electronic circuit(s) may comprise passive components (e.g., capacitors and resistors) and active components (e.g., processors) arranged and/or programmed to implement the methods disclosed herein.

The hardware architecture of FIG. 2 represents a representative RFID security tag 200 configured to facilitate improved inventory pricing management. In this regard, the RFID security tag 200 is configured for allowing data to be exchanged with an external device (e.g., computing device 112 of FIG. 1) via wireless communication technology. The wireless communication technology can include, but is not limited to, a Radio Frequency Identification ("RFID") technology, a Near Field Communication ("NFC") technology, and/or a Short Range Communication ("SRC") technology. For example, one or more of the following wireless communication technologies (is)are employed: Radio Frequency ("RF") communication technology; Bluetooth technology; WiFi technology; beacon technology; magnetic induction; and/or LiFi technology. Each of the listed wireless communication technologies is well known in the art, and therefore will not be described in detail herein. Any known or to be known wireless communication technology or other wireless communication technology can be used herein without limitation.

The components 306-316, 318 shown in FIG. 3 may be collectively referred to herein as a communication enabled device 304, and include a memory 308 and a clock/timer 318. Memory 308 may be a volatile memory and/or a non-volatile memory. For example, the memory 308 can include, but is not limited to, Random Access Memory ("RAM"), Dynamic RAM ("DRAM"), Static RAM ("SRAM"), Read Only Memory ("ROM") and flash memory. The memory 308 may also comprise unsecure memory and/or secure memory.

In some scenarios, the communication enabled device 304 comprises a Software Defined Radio ("SDR"). SDRs are well known in the art, and therefore will not be described in detail herein. However, it should be noted that the SDR can be programmatically assigned any communication protocol that is chosen by a user (e.g., RFID, WiFi, LiFi, Bluetooth, BLE, Nest, ZWave, Zigbee, etc.). The communication protocols are part of the device's firmware and reside in memory 308. Notably, the communication protocols can be downloaded to the device at any given time. The initial/default role (being an RFID, WiFi, LiFi, etc. tag) can be assigned at the deployment thereof. If the user desires to use another protocol at a later time, the user can remotely change the communication protocol of the deployed RFID security tag 200. The update of the firmware, in case of issues, can also be performed remotely.

As shown in FIG. 3, the communication enabled device 304 comprises at least one antenna 302, 312 for allowing data to be exchanged with the external device via a wireless communication technology (e.g., an RFID technology, an NFC technology and/or a SRC technology). The antenna 302, 312 is configured to receive signals from the external device and/or transmit signals generated by the communication enabled device 304. In some scenarios, the antenna 302, 312 comprises a near-field or far-field antenna. The antennas includes, but are not limited to, a chip antenna or a loop antenna.

The communication enabled device 304 also comprises a transceiver 306. Transceivers are well known in the art, and therefore will not be described herein. However, it should be understood that the transceiver 306 generates and transmits signals (e.g., RF carrier signals) to external devices, as well as receives signals (e.g., RF signals) transmitted from external devices. In this way, the communication enabled device 304 facilitates the registration, identification, location and/or tracking of an item (e.g., item 118 of FIG. 1) to which the RFID security tag 200 is coupled. The communication enabled device 304 also facilitates the automatic and dynamic modification of item level information that is being or is to be output from the RFID security tag 200 in response to certain trigger events. The trigger events can include, but are not limited to, the EST's arrival at a particular facility (e.g., facility 102 of FIG. 1), the EST's arrival in a particular country or geographic region, a date occurrence (e.g., black Friday), a time occurrence, a price change, and/or the reception of user instructions.

Item level information 314 and/or other information 324 associated with the identification and/or location of the RFID security tag 200 can be stored in memory 308 of the communication enabled device 304 and/or communicated to other external devices (e.g., computing device 112 of FIG. 1) via transceiver 306 and/or interface 340 (e.g., an Internet Protocol or cellular network interface). For example, the communication enabled device 304 can communicate information specifying a timestamp, a unique identifier, item description, item price, a currency symbol and/or location information to an external computing device. The external computing device (e.g., server) can then store the information in a database (e.g., database 114 of FIG. 1) and/or use the information during language and/or currency conversion operations. The item level information 314 is stored in memory 308 as display information (i.e., information that is or is to be displayed on a display screen of the RFID security tag or output from a speaker of the RFID security tag). Once this information is displayed on the display screen or output from the speaker, it is considered advertised information.

The communication enabled device 304 also comprises a controller 310, input/output devices 316 (e.g., a speaker and/or display), and/or input/output device driver(s) 313. Although the components 313 and 316 are shown as separate component blocks in FIG. 3, the present solution is not limited in this regard. Alternatively, the components 313 and 316 can be a single component (e.g., a display driver is built into the display component). The controller 310 can also execute instructions 322 implementing methods for facilitating the management of item pricing. In this regard, the controller 310 includes a processor (or logic circuitry that responds to instructions) and the memory 308 includes a computer-readable storage medium on which is stored one or more sets of instructions 322 (e.g., software code) configured to implement one or more of the methodologies, procedures, or functions described herein. The instructions 322 can also reside, completely or at least partially, within the controller 310 during execution thereof by the RFID security tag 200. The memory 308 and the controller 310 also can constitute machine-readable media. The term "machine-readable media", as used here, refers to a single medium or multiple media (e.g., a centralized or distributed database, and/or associated caches and servers) that store the one or more sets of instructions 322. The term "machine-readable media", as used here, also refers to any medium that is capable of storing, encoding or carrying a set of instructions 322 for execution by the RFID security tag 200 and that cause the RFID security tag 200 to perform any one or more of the methodologies of the present disclosure.

The input/output devices can include, but are not limited to, a display (e.g., an E Ink display, an LCD display and/or an active matrix display), a speaker, a keypad and/or light emitting diodes. The display is used to present item level information 314 in a textual format and/or graphical format. Similarly, the speaker may be used to output item level information 314 in an auditory format. The speaker and/or light emitting diodes may be used to output alerts for drawing a person's attention to the RFID security tag 200 and/or for notifying the person of a particular pricing status (e.g., on sale status) of the item to which the RFID security tag is coupled.

The RFID security tag 200 also includes an RFID component 346 which may be passive, active or semi-passive. Item related information 348 is stored in the RFID component 346. The item related information can include item level information. More specifically, the item related information can include, but is not limited to, an item description, item nutritional information, a promotional message, an item regular price, an item sale price, a currency symbol, and/or a source of the item. In some scenarios, the RFID component 346 comprises an Integrated Circuit ("IC") chip. IC chips are well known in the art, and therefore will not be described herein. Any known or to be known IC chip can be used herein without limitation. During operation, the RFID component 346 communicates the item related information 348 to an external device via a wireless communication. For example, the item related information 348 is communicated from the RFID component 346 to a POS (e.g., POS 126 of FIG. 1) as register information for use during a purchase transaction. The item related information 348 can be updated at any point in time. This update is achieved by (a) receiving new item related information at the RFID component 346 and (b) writing over previous item related information with the new item related information.

As noted above, it is important to have the advertised information and the register information match each other. In order to achieve this, a micro-controller 352 is provided (which is external to the RFID component 346 and communication enabled device 304) for ensuring that the item related information 314 and 348 are synchronized with each other each time one of them is updated. Exemplary methods for such synchronization are described below in relation to FIGS. 6-8. The operations of the micro-controller 352 will become evident as the discussion progresses.

The clock/timer 318 is configured to determine a date, a time, and/or an expiration of a pre-defined period of time. Technique for determining these listed items are well known in the art, and therefore will not be described herein. Any known or to be known technique for determining these listed items can be used herein without limitation.

The RFID security tag 200 may comprise an optional location module 330. The location module 330 is generally configured to determine the geographic location of the RFID security tag at any given time. For example, in some scenarios, the location module 330 employs Global Positioning System ("GPS") technology and/or Internet based local time acquisition technology. The present solution is not limited to the particulars of this example. Any known or to be known technique for determining a geographic location can be used herein without limitation.

The optional coupler 342 is provided to securely or removably couple the RFID security tag 200 to an item (e.g., item 118 of FIG. 1). The coupler 342 includes, but is not limited to, a mechanical coupling means (e.g., a strap, clip, clamp, snap) and/or adhesive (e.g., glue or sticker). The coupler 342 is optional since the coupling can be achieved via a weld and/or chemical bond.

The RFID security tag 200 can also include an optional energy harvesting circuit 332, an optional power management circuit 334, an optional rechargeable battery 336, and/or an optional Electronic Article Surveillance ("EAS") component 344. Each of the listed optional components 336, 344 is well known in the art, and therefore will not be described herein. Any known or to be known battery and/or EAS component can be used herein without limitation.

The energy harvesting circuit 332 and power management circuit 334 are provided for ensuring continuous operation of the RFID security tag 200 without the need to change a battery. In some scenarios, the energy harvesting circuit 302 is configured to harvest energy from one or more sources (e.g., heat, light, vibration, magnetic field, and/or RF energy) and to generate a relatively low amount of output power from the harvested energy. By employing multiple sources for harvesting, the device can continue to charge despite the depletion of a source of energy.

The energy harvesting circuit 332 can operate in two (2) ways. First, the energy harvesting circuit 332 can harvest energy from an available source while online (i.e., when the RFID security tag 200 is attached to merchandise). Second, the energy harvesting circuit 332 can harvest energy while offline (i.e., when the RFID security tag 200 is detached from merchandise) via a charging station/bin. This ensures that the RFID security tag 200 is fully charged when the RFID security tag is ready to be deployed or go online.

The energy harvesting circuit 332 can also be supplemented with bigger harvesters and/or a mains power source. In this case, the energy harvesting circuit 332 can be placed closer to its primary source (e.g., a solar panel on top of a shelf) and power from there can be distributed over two (2) wires. The design allows multiple labels to be connected to a single harvester circuit. The harvester circuit can be replaces with the mains power source.

The RFID security tag 200 may also include optional sensors 350 employing proximity sensing technology. The sensors 350 can include, but are not limited to, an IR detector, a camera, and/or an RF detection unit. The input/output devices 316 (e.g., the display) can be turned off when a person is not located in proximity thereto. This capability is useful when the input/output devices 316 (e.g., the display) is not considered low power.

The power management circuit 334 is generally configured to control the supply of power to components of the RFID security tag 200. In the event all of the storage and harvesting resources deplete to a point where the RFID security tag 200 is about to enter a shutdown/brownout state, the power management circuit 334 can cause an alert to be sent from the RFID security tag 200 to a remote device (e.g., computing device 112 of FIG. 1). In response to the alert, the remote device can inform an associate (e.g., a store employee) so that (s)he can investigate why the RFID security tag 200 is not recharging and/or holding charge.

Figure 4:
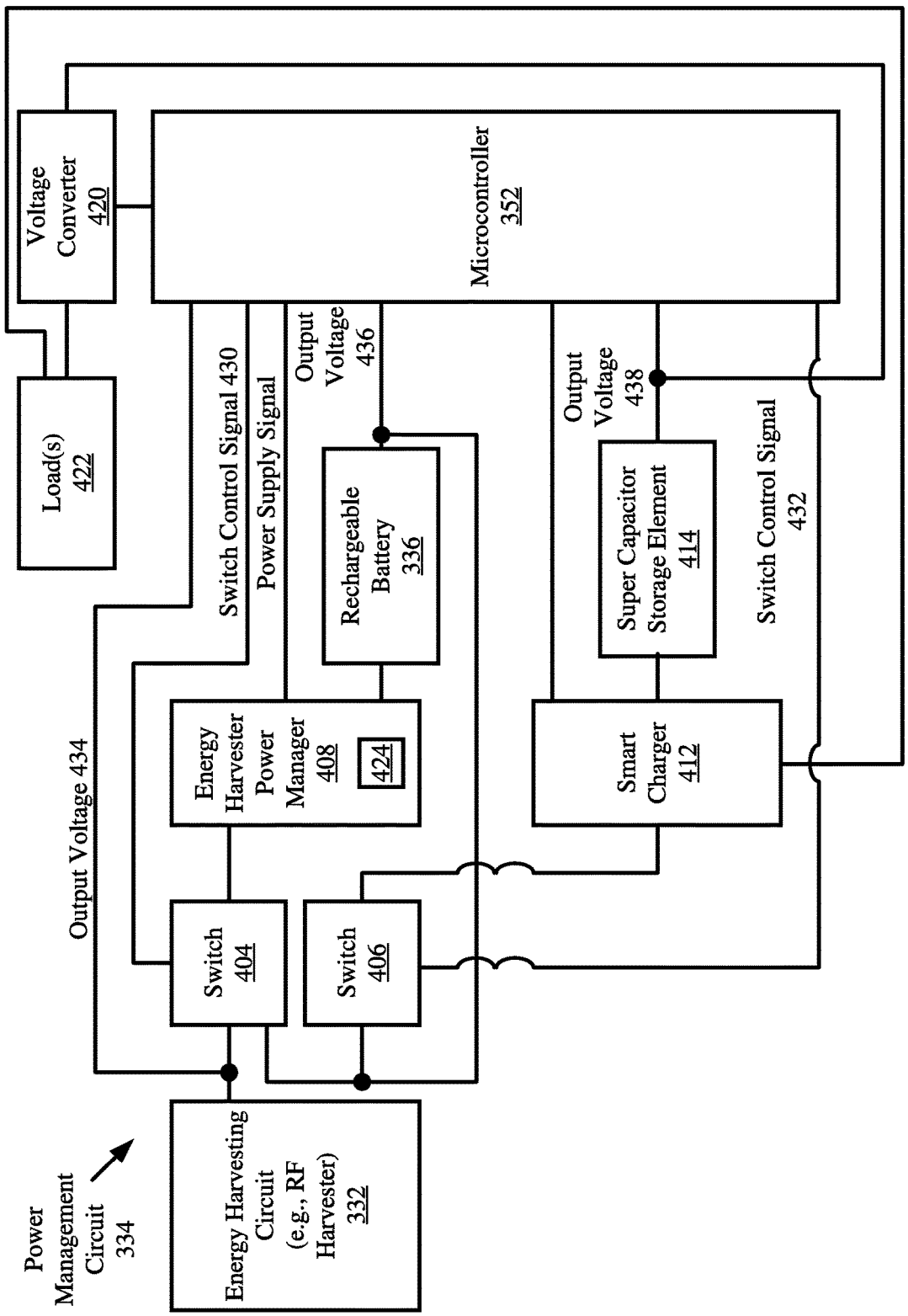
FIG. 4 provides an illustration of an exemplary architecture for an EST's power management circuit.

Referring now to FIG. 4, there is provided a block diagram of an exemplary architecture 400 for the power management circuit 334 of the RFID security tag 200. The power management circuit 334 is not limited to the particular architecture shown in FIG. 4. In this regard, it should be understood that that power management circuit 334 can include more or less components than that shown in FIG. 4.

The power management circuit 334 is configured to provide a way in which the RFID security tag 200 is: deployable as a plug-n-play energy harvested wireless sensor that is ready to function as soon as it is turned on; and a self-sustaining sensor system wherein its power source would virtually never need to be replaced. In this regard, the power management circuit 334 is electrically connected to the energy harvesting circuit 332 and the optional rechargeable battery 336. The power management circuit 334 comprises switches 404, 406, an Energy Harvester Power Manager ("EHPM") 408, a Super Capacitor ("SC") storage element 414, a smart charger 412 for the SC storage element, a microcontroller 352, and a DC-DC voltage converter 420 electrically connected to a load(s) 422. The microcontroller 352 can be the same as or separate/distinct from the controller 310 of FIG. 3. The load 422 can include, but is not limited to, components 304, 330, 340, 350, 352, 344 and/or 346 of FIG. 3.

In some scenarios, the energy harvesting circuit 332 comprises a solar cell circuit. The present invention is not limited in this regard. Other types of energy harvesting circuits can be used herein that generate a relatively low amount of output power.

At initial power up of the RFID security tag 200, the SC storage element 414 is assumed to be in a completely discharged state. Thus, the initial charge of the SC storage element 414 is at a level of approximately or substantially equal to zero volts. However, the rechargeable battery 336 is in a quasi-discharged state in which its initial charge is at a level greater than zero volts (e.g., 3 volts). As such, the rechargeable battery 336 has a sufficient amount of initial stored energy to nearly instantaneously enable operations of the control electronics of the RFID security tag 200. In this regard, an output voltage 436 is supplied from the rechargeable battery 336 to the EHPM 408 via switch 404, whereby operations of boost converters 424 contained in the EHPM 408 are started immediately after turning on the RFID security tag 200. The output voltage 436 is also supplied from the rechargeable battery 336 to the microcontroller 352 via the EHPM 408.

The available power from rechargeable battery is also used at this time to charge the SC storage element 414. In this regard, the output voltage 436 of the rechargeable battery 336 is supplied to the SC storage element 414 via switch 406 and smart charger 412, whereby charging of the SC storage element is expedited. An output voltage 438 of the SC storage element is supplied to the load(s) 422 via the voltage converter 420. The RFID security tag 200 is considered fully operational when the output voltage 438 reaches a level (e.g., 3.8 V) that is sufficient to cause the load(s) to perform the intended operations thereof.

Throughout operation of the RFID security tag 200, the microcontroller 352 monitors the output voltage 434 of the solar cell circuit 402, as well as the output voltage 436 of the rechargeable battery and the output voltage 438 of the SC storage element 414. Once the output voltage 438 of the SC storage element 414 reaches a desired voltage (e.g., 3.8 V) after system activation (or powering on), the microcontroller 352 enables a timer to time the charging of the SC storage element 414. After a pre-determined time period (e.g., 6 hours), an assumption is made that the SC storage element 414 has reached its leakage current equilibrium, and therefore no longer needs to be charged. In effect, the microcontroller 352 may optionally perform operations at this time to terminate the supply of output voltage 436 to the SC storage element 414 via switch 406 and smart charger 412.

When the output voltage 438 of the SC storage element 414 falls below a threshold value (e.g., 3.3 V), the microcontroller 352 communicates a switch control signal 432 to switch 406 so as cause the output voltage 436 of the rechargeable battery 336 to once again be supplied to the SC storage element 414 via the smart charger 412. Output voltage 436 is supplied to the SC storage element 414 until the output voltage 438 thereof exceeds an upper threshold value. In effect, the SC storage element 414 is recharged whereby the energy expended while driving load(s) 422 is(are) restored.

When the solar cell circuit 402 is active, the output voltage 434 of the solar cell circuit 402 is supplied to the rechargeable battery 336 via EHPM 408. In effect, the rechargeable battery 336 is recharged by the solar cell circuit 402, whereby the energy expended in charging and re-charging the SC storage element 414 is restored while the RFID security tag 200 is maintained in its fully operational state.

The above described process of using the rechargeable battery 336 to charge the SC storage element 414 is repeated as needed. Thus, the above described RFID security tag 200 performs self-monitoring and charges its respective rechargeable elements throughout its entire operation.

Figure 5:
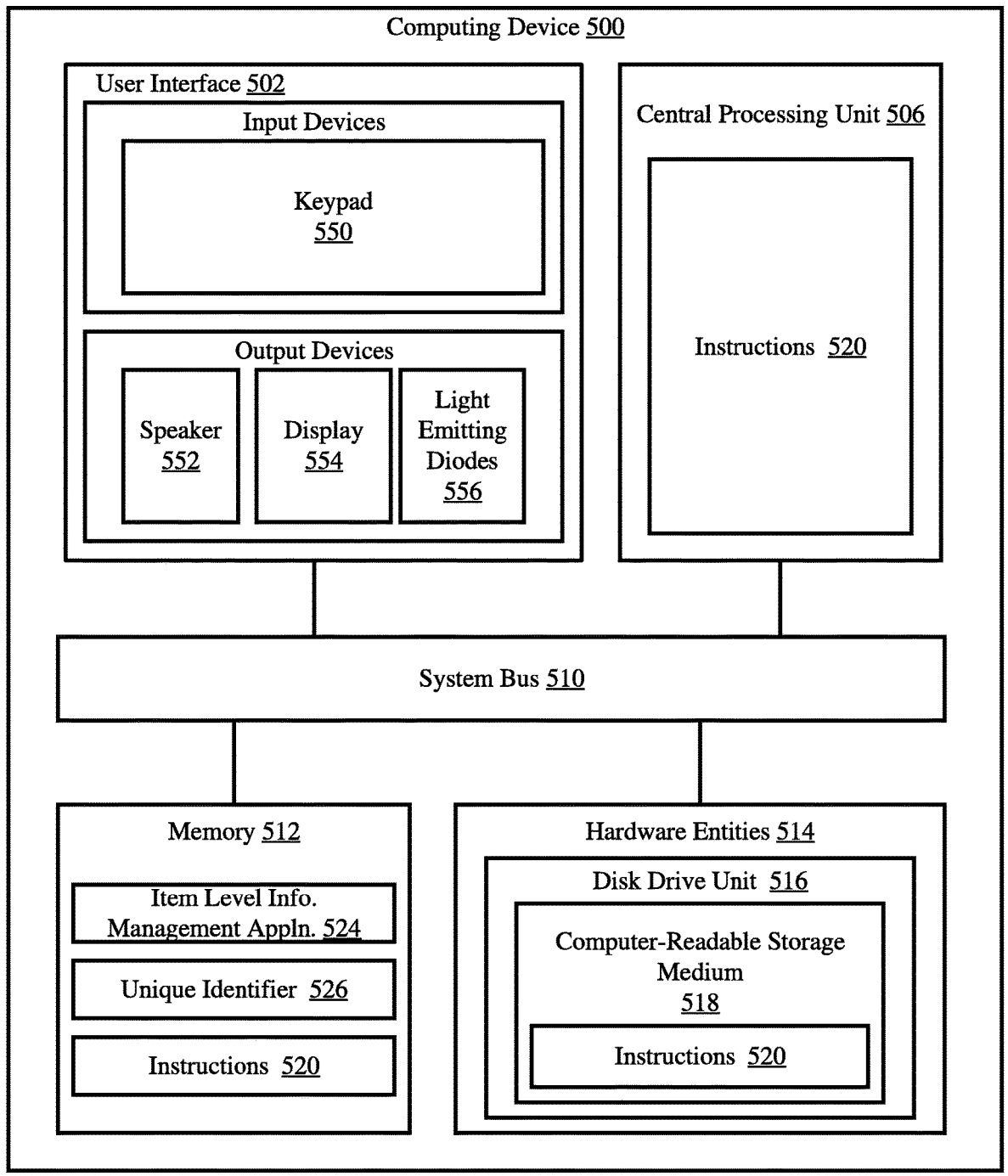
FIG. 5 is an illustration of an exemplary computing device.

Referring now to FIG. 5, there is provided a detailed block diagram of an exemplary architecture for a computing device 500. Computing device 112 of FIG. 1 is the same as or substantially similar to computing device 500. As such, the following discussion of computing device 500 is sufficient for understanding computing device 112.

Computing device 500 may include more or less components than those shown in FIG. 5. However, the components shown are sufficient to disclose an illustrative embodiment implementing the present solution. The hardware architecture of FIG. 5 represents one embodiment of a representative computing device configured to facilitate improved inventory pricing management. As such, the computing device 500 of FIG. 5 implements at least a portion of a method for automatically and dynamically modifying item level information output from RFID security tags in accordance with the present solution.

Some or all the components of the computing device 500 can be implemented as hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to and/or programmed to perform one or more of the methodologies, procedures, or functions described herein.

As shown in FIG. 5, the computing device 500 comprises a user interface 502, a Central Processing Unit ("CPU") 506, a system bus 510, a memory 512 connected to and accessible by other portions of computing device 500 through system bus 510, and hardware entities 514 connected to system bus 510. The user interface can include input devices (e.g., a keypad 550) and output devices (e.g., speaker 552, a display 554, and/or light emitting diodes 556), which facilitate user-software interactions for controlling operations of the computing device 500.

At least some of the hardware entities 514 perform actions involving access to and use of memory 512, which can be a RAM, a disk driver and/or a Compact Disc Read Only Memory ("CD-ROM"). Hardware entities 514 can include a disk drive unit 516 comprising a computer-readable storage medium 518 on which is stored one or more sets of instructions 322 (e.g., software code) configured to implement one or more of the methodologies, procedures, or functions described herein. The instructions 520 can also reside, completely or at least partially, within the memory 512 and/or within the CPU 506 during execution thereof by the computing device 500. The memory 512 and the CPU 506 also can constitute machine-readable media. The term "machine-readable media", as used here, refers to a single medium or multiple media (e.g., a centralized or distributed database, and/or associated caches and servers) that store the one or more sets of instructions 520. The term "machine-readable media", as used here, also refers to any medium that is capable of storing, encoding or carrying a set of instructions 322 for execution by the computing device 500 and that cause the computing device 500 to perform any one or more of the methodologies of the present disclosure.

In some scenarios, the hardware entities 514 include an electronic circuit (e.g., a processor) programmed for facilitating the provision of item level information in a language and currency used in a given geographic location whereat or wherein an RFID security tag resides. In this regard, it should be understood that the electronic circuit can access and run an item level information management application 524 installed on the computing device 500. The software application 524 is generally operative to: obtain item level information and/or other information from the RFID security tag; program item level information onto the RFID security tag for purposes of output as advertised information and/or register information; convert the language, pricing and/or currency symbol of item level information; and/or facilitate registration of RFID security tags with inventory systems. Other functions of the software application 524 will become apparent as the discussion progresses.

Figure 6:
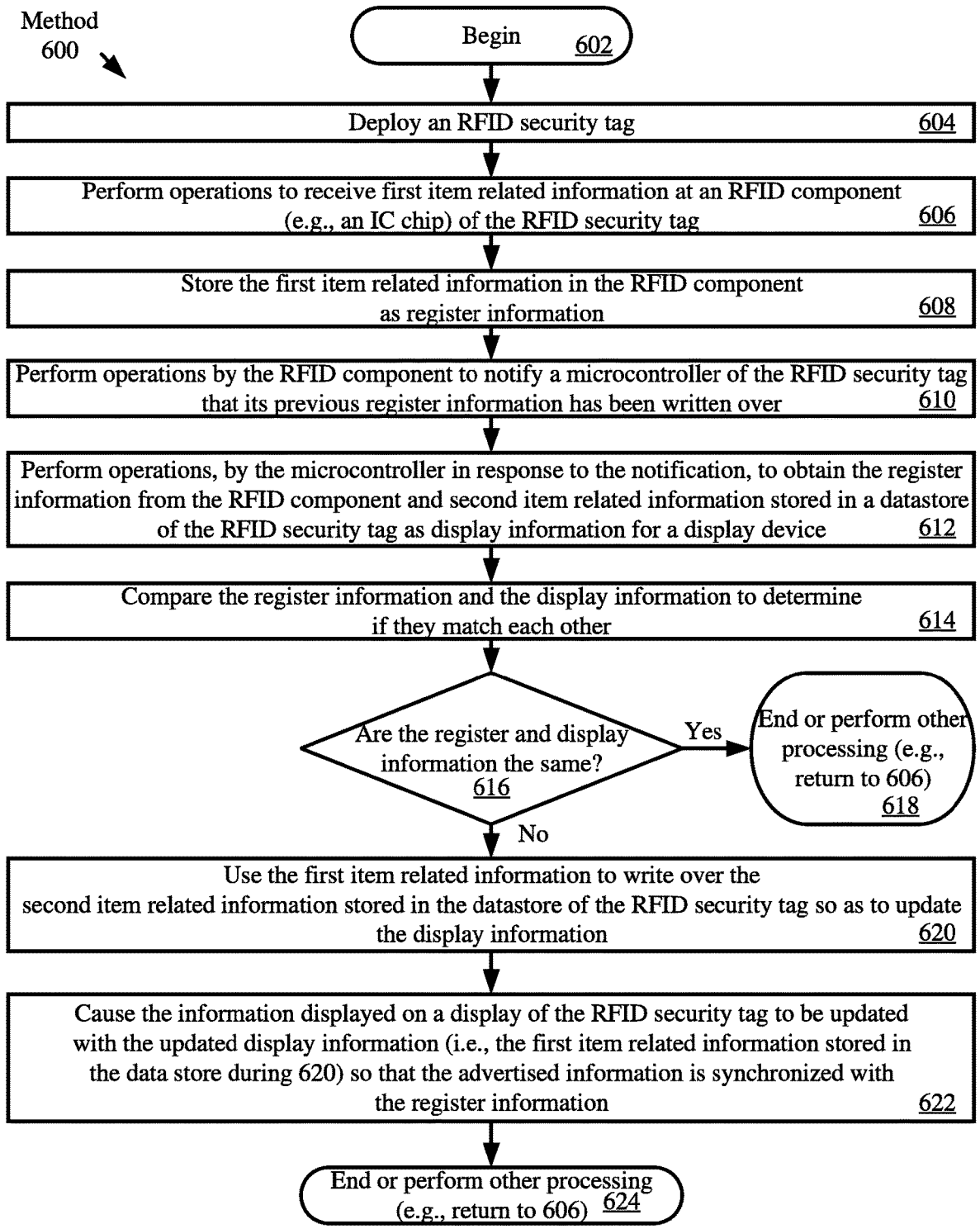
FIG. 6 is a flow diagram of an exemplary method for operating an EST.

Referring now to FIG. 6, there is provided a flow diagram of an exemplary method 600 for operating an RFID security tag (e.g., RFID security tag 120 of FIG. 1 and/or RFID security tag 200 of FIGS. 2-4). Method 600 begins with 602 and continues with 604 where the RFID security tag is deployed. In some scenarios, the RFID security tag is deployed by coupling it to an item (e.g., a piece of merchandise), programming it to display certain item related information (e.g., a price and/or product description), and/or placing the item/RFID security tag on display equipment (e.g., display equipment 122 of FIG. 1).

In next 606, operations are performed by an RFID component (e.g., RFID component 346 of FIG. 3) to receive first item related information from an external device (e.g., computing device 112 of FIG. 1 and/or a handheld tag scanner). The first item related information can include item level information such as an item description, item nutritional information, a promotional message, an item regular price, an item sale price, a currency symbol, and/or a source of the item. The first item related information can be communicated to the RFID component when it needs to be programmed with such information or when previous information needs to be updated. The first item related information is then stored in the RFID component as register information (e.g., stored item related information 348 of FIG. 3), as shown by 608. Thereafter, the RFID component notifies a microcontroller (e.g., microcontroller 352 of FIG. 3) of the RFID security tag that its previous register information has been written over.

In response to the notification, the microcontroller performs operations in 612 to obtain the register information from the RFID component and second item related information stored in a datastore (e.g., memory 308 of FIG. 3) of the RFID security tag as display information for a display device (e.g., display device 316 of FIG. 3). The second item related information can include item level information such as an item description, item nutritional information, a promotional message, an item regular price, an item sale price, a currency symbol, and/or a source of the item. The present invention is not limited to the particulars of 612. For example, the second item related information may also be output from a speaker of the RFID security tag, and therefore additionally or alternatively stored in datastore as audio information.

In 614, the microcontroller then compares the register information and the display information to determine if they match each other. If the register and display information are the same [616:YES], then 618 is performed where method 600 ends or other processing is performed (e.g., return to 606). In contrast, if the register and display information are not the same [616:YES], then the first item related information is used in 620 to write over the second item related information stored in the datastore of the RFID security tag so as to update the display information. Next in 622, the information displayed on the display screen is replaced with the updated display information so that the advertised information is synchronized with the register information. Subsequently, 624 is performed where method 600 ends or other processing is performed (e.g., return to 606).

Figure 7:
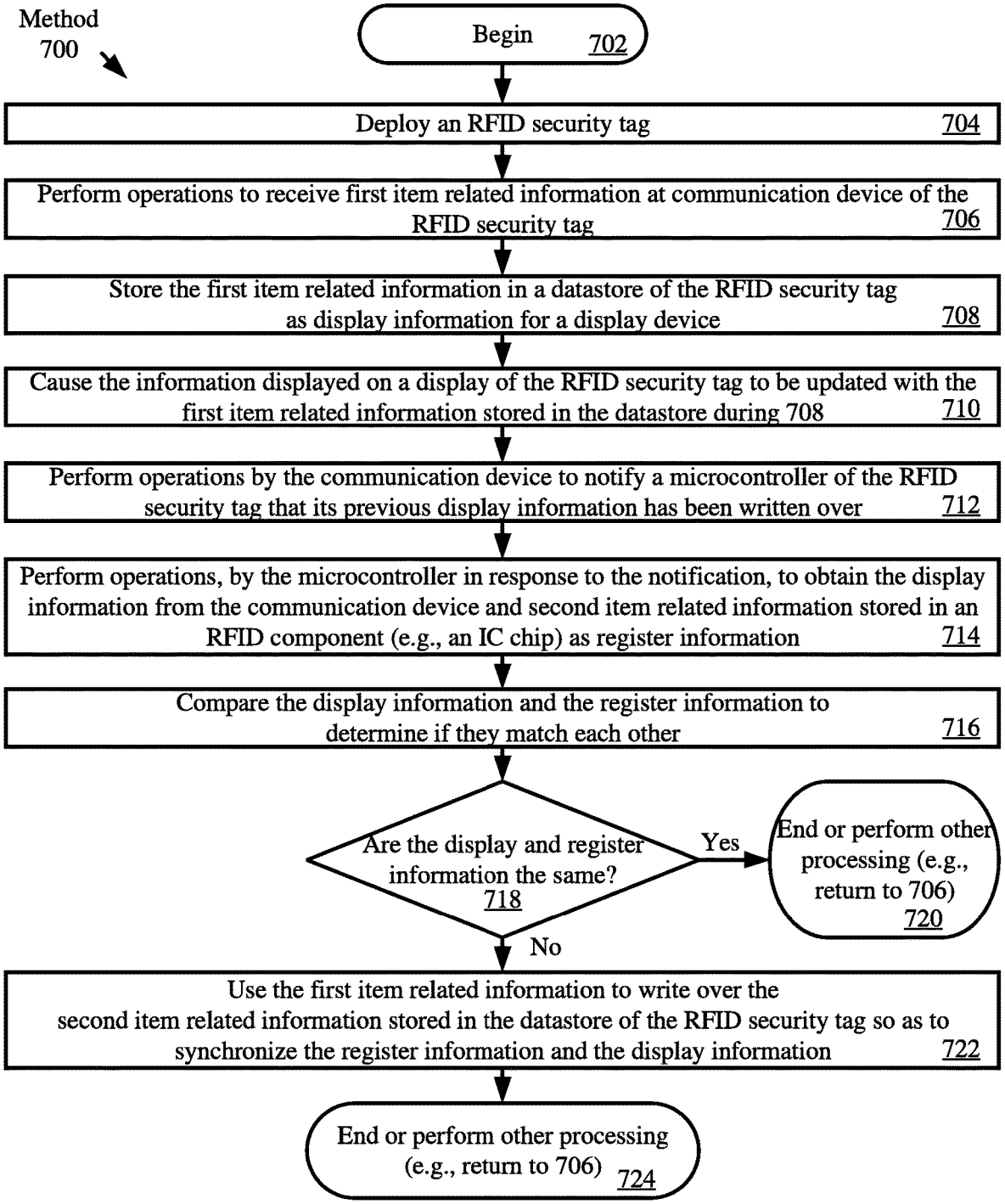
FIG. 7 is a flow diagram of another exemplary method for operating an EST.

Referring now to FIG. 7, there is provided a flow diagram of an exemplary method for operating an RFID security tag (e.g., RFID security tag 120 of FIG. 1 and/or RFID security tag 200 of FIGS. 2-4). Method 700 begins with 702 and continues with 704 where the RFID security tag is deployed. In some scenarios, the RFID security tag is deployed by coupling it to an item (e.g., a piece of merchandise), programming it to display certain item related information (e.g., a price and/or product description), and/or placing the item/ RFID security tag on display equipment (e.g., display equipment 122 of FIG. 1).

In next 706, a communication device (e.g., communication device 304 of FIG. 3) of the RFID security tag receives first item related information from an external device (e.g., computing device 112 of FIG. 1 or a handheld tag scanner). The first item related information can include item level information such as an item description, item nutritional information, a promotional message, an item regular price, an item sale price, a currency symbol, and/or a source of the item. The first item related information is then stored in a datastore of the RFID security tag as display information, as shown by 708. Thereafter in 710, the information displayed on a display device of the RFID security tag is replaced with the first item related information.

The communication device then notifies a microcontroller (e.g., microcontroller 352 of FIG. 3) in 712 that the previous display information has been written over. In response to the notification, the microcontroller performs operations in 714 to obtain the display information (e.g., item related information 314 of FIG. 3) from the communication device and second item related information (e.g., item related information 348 of FIG. 3) stored in an RFID component (e.g., RFID component 346 of FIG. 3) as register information. The second item related information can include item level information such as an item description, item nutritional information, a promotional message, an item regular price, an item sale price, a currency symbol, and/or a source of the item. If the display and register information are the same [718:YES], then 720 is performed where method 700 ends or other processing is performed. In contrast, if the display and register information are not the same [718:NO], then 722 is performed where the first item related information is used to write over the second item related information stored in the datastore of the RFID security tag so as to synchronize the register information and the display information. Subsequently, 724 is performed where method 700 ends or other processing is performed (e.g., return to 706).

Figure 8:
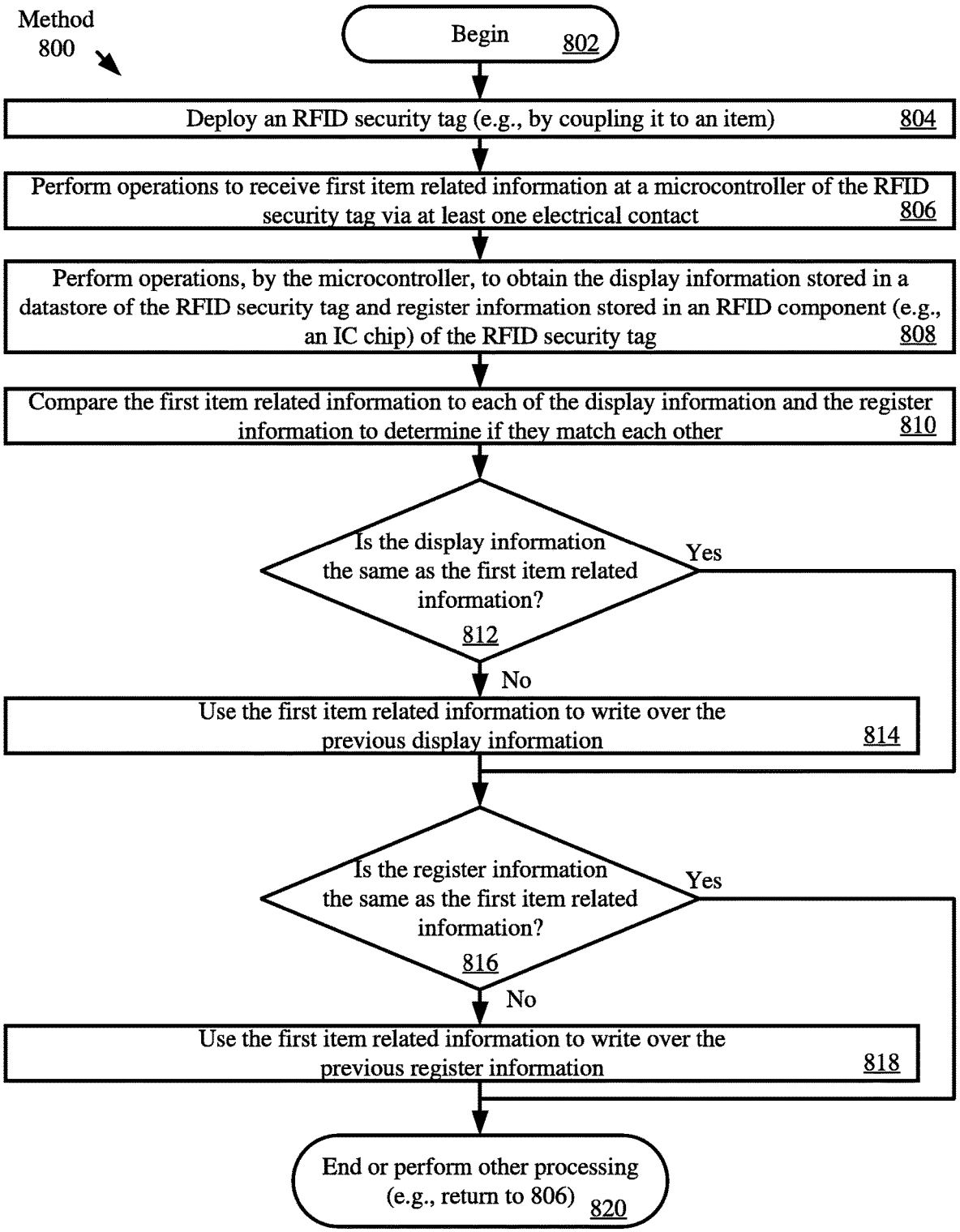
FIG. 8 is a flow diagram of yet another exemplary method for operating an EST.

Referring now to FIG. 8, there is provided a flow diagram of an exemplary method 800 for operating an RFID security tag (e.g., RFID security tag 120 of FIG. 1 and/or RFID security tag 200 of FIGS. 2-4). Method 800 begins with 802 and continues with 804 where the RFID security tag is deployed. In some scenarios, the RFID security tag is deployed by coupling it to an item (e.g., a piece of merchandise), programming it to display certain item related information (e.g., a price and/or product description), and/or placing the item/RFID security tag on display equipment (e.g., display equipment 122 of FIG. 1).

In next 806, a microcontroller (e.g., microcontroller 352 of FIG. 3) of the RFID security tag receives first item related information via at least one electrical contact (e.g., electrical contact(s) 370 of FIG. 3). The first item related information can include item level information such as an item description, item nutritional information, a promotional message, an item regular price, an item sale price, a currency symbol, and/or a source of the item.

In response to the microcontroller's reception of the first item related information, 808 is performed where the microcontroller performs operations to obtain (a) the display information stored in a memory (e.g., memory 308 of FIG. 3) of the RFID security tag and (b) the register information stored in an RFID component (e.g., RFID component 346 of FIG. 3) of the RFID security tag. The first item related information is then compared to each of the display information and the register information to determine if they match each other, as shown by 810. If the display information is the same as the first item related information (e.g., by a certain degree) [812:YES], then method 800 continues to decision 816 which will be described below. In contrast, if the display information is different than the first item related information (e.g., by a certain degree) [812:NO], 814 is performed where the first item related information is used to write over the previous display information. Upon completing 814, 816 is performed.

In 816, a decision is made as to whether the register information is the same as the first item related information. If the register information is the same as the first item related information (e.g., by a certain degree) [816:YES], then method 800 continues to 820 which will be described below. In contrast, if the register information is different than the first item related information (e.g., by a certain degree) [816:NO], 818 is performed where the first item related information is used to write over the previous register information. Subsequently, 820 is performed where method 800 ends or other processing is performed (e.g., return to 806).

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application. Thus, the breadth and scope of the present invention should not be limited by any of the above described embodiments. Rather, the scope of the invention should be defined in accordance with the following claims and their equivalents.

What is claimed is:

1. A method for operating a security tag, comprising:
receiving, by a first external interface of the security tag, first item related information from a first external device;
storing, by the first external interface, the received first item related information in a first dedicated memory store of the first external interface;
updating, by a microcontroller of the security tag, a second dedicated memory store of a second external interface of the security tag with the received first item related information;
receiving, by the second external interface, second item related information from a second external device;
storing, by the second external interface, the received second item related information in the second dedicated memory store of the second external interface; and
updating, by the microcontroller based on comparing the second item related information with the first item related information stored in the first dedicated memory store of the first external interface, the first dedicated memory store of the first external interface with the received second item related information.

2. The method of claim 1, wherein the first external interface is a radio frequency identification (RFID) interface, and the second external interface is a non-RFID communication device interface.

3. The method of claim 2, wherein the microcontroller receives third item related information directly from an integrated RFID element, a communications device of the security tag, or an external device via at least one electrical contact of the security tag.

4. The method of claim 1, wherein the item related information comprises at least one of an item description, item nutritional information, a promotional message, an item regular price, an item sale price, a currency symbol, and a source of the item.

5. The method of claim 1, further comprising harvesting energy from an external energy source and using the harvested energy to power electronic components of the security tag at least during the method.

6. The method of claim 1, wherein the security tag comprises an integrated Electronic Article Surveillance ("EAS") component in addition to an integrated radio frequency identification (RFID) component.

7. The method of claim 1, wherein the first external interface is a radio frequency identification (RFID) interface, and further comprising updating, based on updating the second dedicated memory store, a display of the security tag with the received first item related information.

8. A security tag, comprising:
a plurality of external interfaces over which the tag can receive item related information, each external interface associated with a dedicated store for received item related information; and
a microcontroller;
the security tag configured to:
receive, by a first external interface of the plurality of interfaces, first item related information;
store, by the first external interface, the received first item related information in the dedicated memory store of the first external interface;
updating, by the microcontroller, the dedicated memory store of a second external interface of the plurality of external interfaces, other than the first external interface, with the received first item related information;
receive, by the second external interface, second item related information;
store, by the second external interface, the received second item related information in the dedicated memory store of the second external interface; and
update, by the microcontroller based on comparing the second item related information with the first item related information stored in the first dedicated memory store of the first external interface, the dedicated memory store of the first external interface with the received second item related information.

9. The security tag of claim 8, wherein the first external interface is a radio frequency identification (RFID) interface, and the second external interface is a non-RFID communication device interface.

10. The security tag of claim 9, wherein the microcontroller receives third item related information directly from an integrated RFID element, a communications device of the security tag, or an external device via at least one electrical contact of the security tag.

11. The security tag of claim 8, wherein the item related information comprises at least one of an item description, item nutritional information, a promotional message, an item regular price, an item sale price, a currency symbol, and a source of the item.

12. The security tag of claim 8, further comprising an energy harvesting circuit configured to harvest energy from an external energy source and use the harvested energy to power electronic components of the security tag for updating the dedicated memory stores.

13. The security tag of claim 8, further comprising an integrated Electronic Article Surveillance ("EAS") component and an integrated radio frequency identification (RFID) component.

14. The security tag of claim 8, wherein the first external interface is a radio frequency identification (RFID) interface, and wherein the security tag is configured to update, based on updating the second dedicated memory store, a display of the security tag with the received first item related information.

* * * * *